(12) United States Patent
Pradeep et al.

(10) Patent No.: US 10,275,281 B2
(45) Date of Patent: Apr. 30, 2019

(54) SCHEDULING JOBS FOR PROCESSING LOG FILES USING A DATABASE SYSTEM

(71) Applicant: salesforce.com, inc., San Francisco, CA (US)

(72) Inventors: Aakash Pradeep, Fremont, CA (US); Abhishek Sreenivasa, Hayward, CA (US); Adam Torman, Walnut Creek, CA (US); Alex Warshavsky, Walnut Creek, CA (US); Samarpan Jain, Fremont, CA (US); Soumen Bandyopadhyay, Glen Park, CA (US)

(73) Assignee: salesforce.com, inc., San Francisco, CA (US)

( * ) Notice: Subject to any disclaimer, the term of this patent is extended or adjusted under 35 U.S.C. 154(b) by 231 days.

(21) Appl. No.: 15/281,559

(22) Filed: Sep. 30, 2016

(65) Prior Publication Data
US 2018/0095790 A1 Apr. 5, 2018

(51) Int. Cl.
*G06F 9/46* (2006.01)
*G06F 9/48* (2006.01)
*G06F 16/16* (2019.01)

(52) U.S. Cl.
CPC ............ *G06F 9/4887* (2013.01); *G06F 16/16* (2019.01)

(58) Field of Classification Search
CPC ........... G06F 17/3056; G06F 17/30893; G06F 17/30115; G06F 17/3012; G06F 17/30144; G06F 17/30368; G06F 17/3055; G06F 17/30979; G06F 17/30997; G06F 9/4887
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |

(Continued)

OTHER PUBLICATIONS

U.S. Appl. No. 15/097,090, filed Apr. 12, 2016, Torman, et al.
(Continued)

*Primary Examiner* — Dong U Kim
(74) *Attorney, Agent, or Firm* — Weaver Austin Villeneuve & Sampson LLP

(57) ABSTRACT

Disclosed are some examples of systems, methods, apparatus and computer program products for scheduling jobs to process log files. In some implementations, a scheduler can be configured to identify a final state of a previously scheduled first job as a failure in execution by one or more processors. For instance, the first job may have been defined to process a first input log file saved to a database during a first timeframe of a sequence of timeframes of a designated interval. The scheduler can detect a second input log file saved to the database. The scheduler can then define a second job to process the first input log file and the second input log file and schedule the second job in association with a second timeframe of the sequence.

20 Claims, 9 Drawing Sheets

(56) References Cited

U.S. PATENT DOCUMENTS

| | | |
|---|---|---|
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| 6,347,374 B1 * | 2/2002 | Drake ............... G06F 21/554 709/224 |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 6,973,491 B1 * | 12/2005 | Staveley ............ H04L 41/0253 709/223 |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 7,991,744 B2 * | 8/2011 | Saha .................. G06F 17/30 707/648 |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,973,106 B2 | 3/2015 | Warshavsky et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0138321 A1 * | 9/2002 | Yuan ................ G06Q 10/10 705/80 |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |

(56) References Cited

U.S. PATENT DOCUMENTS

| | | |
|---|---|---|
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0262170 A1* | 11/2005 | Girkar ............... G06F 17/30575 |
| 2005/0273655 A1* | 12/2005 | Chow ................. G06F 11/1479 |
| | | 714/16 |
| 2007/0168704 A1* | 7/2007 | Connolly ............ G06F 11/2025 |
| | | 714/6.1 |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshavsky et al. |
| 2011/0247051 A1 | 10/2011 | Bulumulla et al. |
| 2012/0030172 A1* | 2/2012 | Pareek .............. G06F 17/30575 |
| | | 707/635 |
| 2012/0042218 A1 | 2/2012 | Cinarkaya et al. |
| 2012/0150925 A1* | 6/2012 | Gupta .................. G06F 3/0605 |
| | | 707/822 |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0006441 A1 | 1/2014 | Torman et al. |
| 2014/0013400 A1 | 1/2014 | Warshavsky et al. |
| 2014/0074905 A1* | 3/2014 | Schincariol ............. H04L 67/10 |
| | | 709/201 |
| 2014/0095553 A1* | 4/2014 | Panteleenko ......... G06F 17/303 |
| | | 707/821 |
| 2014/0156722 A1* | 6/2014 | Hinni ..................... H04L 67/16 |
| | | 709/202 |
| 2014/0188986 A1* | 7/2014 | Levy ..................... H04W 4/029 |
| | | 709/203 |
| 2014/0214765 A1* | 7/2014 | Jiang ................ G06F 17/30575 |
| | | 707/634 |
| 2014/0359537 A1 | 12/2014 | Jakobson et al. |
| 2015/0006289 A1 | 1/2015 | Jakobson et al. |
| 2015/0007050 A1 | 1/2015 | Jakobson et al. |
| 2015/0095162 A1 | 4/2015 | Jakobson et al. |
| 2015/0106736 A1 | 4/2015 | Torman et al. |
| 2015/0127670 A1 | 5/2015 | Torman et al. |
| 2015/0142596 A1 | 5/2015 | Jakobson et al. |
| 2015/0142844 A1* | 5/2015 | Bruce ............... G06F 17/30575 |
| | | 707/760 |
| 2015/0172563 A1 | 6/2015 | Jakobson et al. |
| 2016/0041976 A1 | 2/2016 | Pradeep et al. |
| 2016/0105409 A1 | 4/2016 | Torman et al. |
| 2017/0075922 A1 | 3/2017 | Torman et al. |
| 2017/0076012 A1 | 3/2017 | Sreenivasa et al. |
| 2018/0025113 A1 | 1/2018 | Torman et al. |

OTHER PUBLICATIONS

U.S. Appl. No. 15/097,102, filed Apr. 12, 2016, Sreenivasa, et al.
U.S. Appl. No. 15/218,468, filed Jul. 25, 2016, Torman, et al.
"Google Plus Users", Google+Ripples, Oct. 31, 2011 [retrieved on Feb. 21, 2012 from Internet at http://www.googleplusers.com/google-ripples.html], 3 pages.

* cited by examiner

US 10,275,281 B2

SCHEDULING JOBS FOR PROCESSING LOG FILES USING A DATABASE SYSTEM

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This patent document generally relates to log files in a computing environment and, more specifically, to techniques for scheduling jobs to process log files.

BACKGROUND

"Cloud computing" services provide shared resources, software, and information to computers and other devices upon request. In cloud computing environments, software can be accessible over the Internet rather than installed locally on in-house computer systems. Cloud computing typically involves over-the-Internet provision of dynamically scalable and often virtualized resources. Technological details can be abstracted from the users, who no longer have need for expertise in, or control over, the technology infrastructure "in the cloud" that supports them.

BRIEF DESCRIPTION OF THE DRAWINGS

The included drawings are for illustrative purposes and serve only to provide examples of possible structures and operations for the disclosed inventive systems, apparatus, methods and computer program products for scheduling jobs to process log files. These drawings in no way limit any changes in form and detail that may be made by one skilled in the art without departing from the spirit and scope of the disclosed implementations.

DETAILED DESCRIPTION

Figure 1:
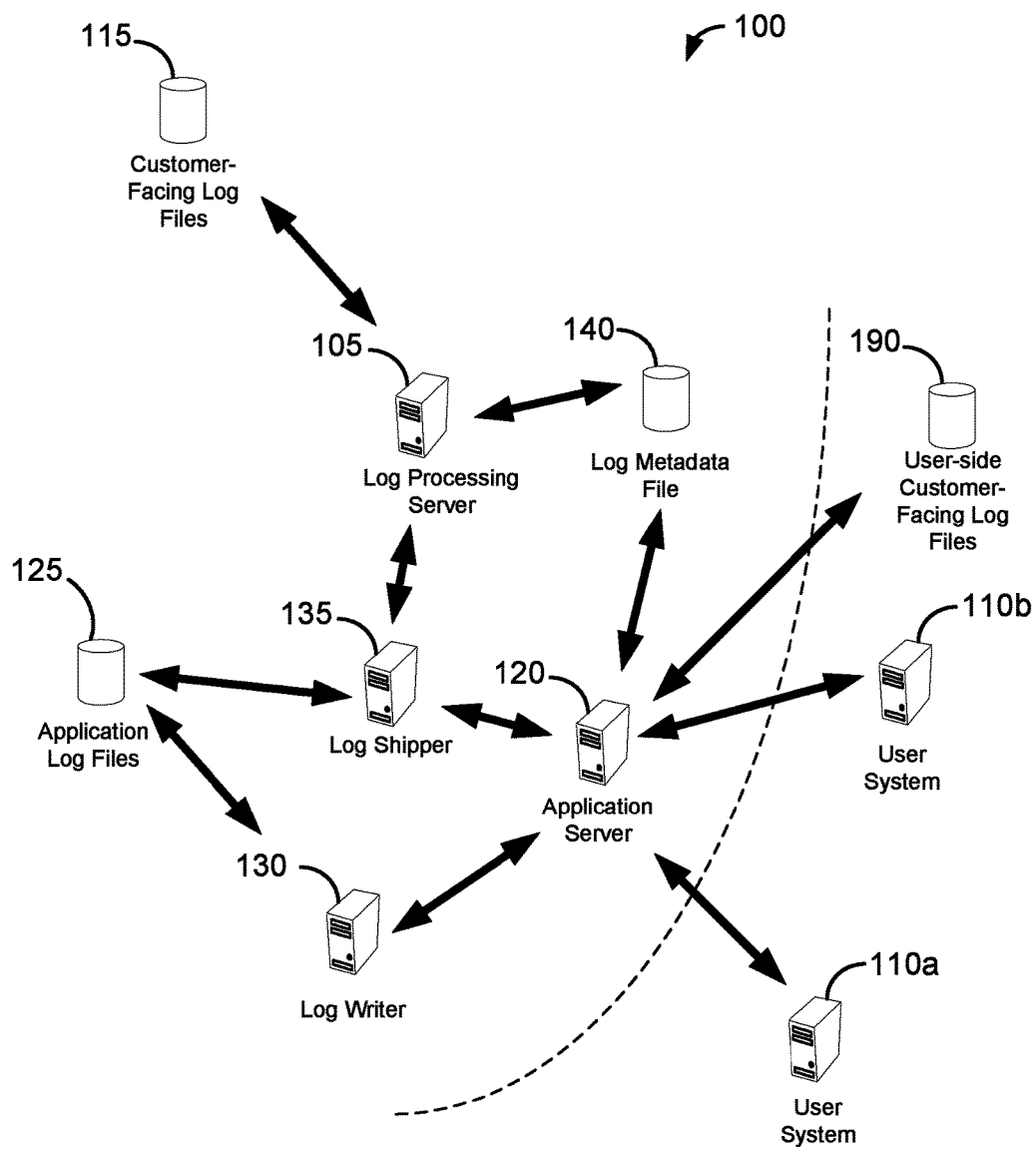
FIG. 1 shows a system diagram of an example of architectural components 100 for processing log files, according to some implementations.

Examples of systems, apparatus, methods and computer program products according to the disclosed implementations are described in this section. These examples are being provided solely to add context and aid in the understanding of the disclosed implementations. It will thus be apparent to one skilled in the art that implementations may be practiced without some or all of these specific details. In other instances, certain operations have not been described in detail to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the operations of methods shown and described herein are not necessarily performed in the order indicated. It should also be understood that the methods may include more or fewer operations than are indicated. In some implementations, operations described herein as separate operations may be combined. Conversely, what may be described herein as a single operation may be implemented in multiple operations.

Some implementations described or referenced herein are directed to different systems, methods, apparatus and computer program products for scheduling jobs to process log files. In some but not all implementations, a database system is used to maintain one or more log files, and the database system can be in the form of a multi-tenant database system. The multiple tenants of the system may include various customer organizations of users who interact with cloud-based applications running on the database system or on a platform associated with the database system. In such systems and in other non-multi-tenant and non-database oriented computing systems and environments in which the present techniques can be implemented, the actions of users when interacting with cloud-based applications may cause data to be generated and/or may cause system events to occur, where some or all of such actions, data, and events can be systematically identified in log files maintained in a database or other repository. Non-limiting examples of system events corresponding to user activity include, by way of illustration, a download, a page load, a login or a logout, a URI which may represent a page click and view, an API call, a report, a record access, an export, or a page request. A system event may be generated in response to any type of user interaction. Such log files can be accessed and analyzed as desired to better understand a history of user activity and/or system events. By way of non-limiting example, a multi-tenant database system may be configured to add, to a log file, data entries identifying corresponding user actions as such actions occur so a system administrator can later analyze the log data for debugging and other analytical purposes.

In some instances, a user affiliated with a tenant organization may want to review some of the log data in a log file. For example, it may be desirable to access a log file storing a history of user login events, where each entry in the log file identifies a user's location at the time the user logged into a system, for example, for the purpose of plotting the locations on a map. However, log files maintained in the same multi-tenant database system may include log data for multiple different tenant organizations. The system administrator may not want to allow one tenant organization to have access to data identifying user activity of another tenant organization. Moreover, the system administrator may set up the log file to generate additional proprietary data of one tenant, such as system performance details or other internal metrics, which should not be shared with other tenants. Accordingly, in some of the disclosed implementations, a server may be configured to parse through a log file maintained by a multi-tenant database service and create different customer-facing log files, where each customer-facing log file has data specific to a particular tenant and is not shared with other tenants. Some types of log entries as well as some types of data fields of the log entries can be automatically excluded from a particular customer-facing log file.

A server generating a customer-facing log file may use a metadata file to identify specific log entry types and data fields to include in the customer-facing log file. In some implementations, a system administrator can specify that only particular types of log entries are provided to the tenant organizations in customer-facing log files. Also or alternatively, only particular fields of the log entries may be provided to the tenant organizations. A database system server can parse through the log files and generate customer-facing log files with log entries specific to a tenant's applications and with the fields of the log entries approved by the developer. Accordingly, a large amount of log file data may be reduced such that each tenant receives a smaller and tailored amount of log file data meaningful to the tenant.

In some implementations, an event log file system provides a declarative metadata framework for providing instructions to a log processing system to process log files for an application. As an example, a Hadoop system including a Hadoop Distributed File System (HDFS) component can be included for storing the log files, and a MapReduce component can be included for processing the log files to generate customer-facing log files. The event log file system may receive a log metadata file that contains instructions for how to process application log files for an application in order to generate customer-facing log files having a particular set of log entries and log entry fields that are designated by the log metadata file. For example, the log metadata file may indicate what types of log entries to include in the customer-facing log file. The log metadata file may also indicate the names and positions of the log entry fields that are to be included in the customer-facing log file. The event log file system then uses this log metadata file to determine how to process the application log files that the event log file system receives.

In some implementations, the log metadata file may be automatically generated based on log entry definition metadata provided by a developer. The log entry definition metadata may be provided to an application server in a log entry definition file. The log entry definition file may contain a description of different types of log entries that may appear in the application log files, as well as the particular fields that appear in each type of log entry. The log entry definition file may also indicate which log entry types and fields should be provided to the customer in a customer-facing log file. The log metadata file may be generated based on the log entry definition file and provided to a job scheduler to perform the log processing.

In some implementations, it is desirable to promote reliability and eventual consistency of customer-facing log files delivered in a multi-tenant database system. Eventual consistency can be based on a consistency model with the goal that if no new updates are made to a given data item, eventually all accesses to that item will return the last updated value. Eventual consistency is often deployed in distributed systems such as multi-tenant database systems.

It is possible that some input log files to be processed to generate customer-facing log files are saved to a database or otherwise identified at a later time than when the input log files were generated. For example, this scenario can result from an application server going offline during some part of the day and coming back online after an initial batch of input log files are streamed for a given hour or other timeframe. In such a scenario, log files may be considered eventually consistent based on a log streaming service picking up a past input log file for a future job to process the log file. In some implementations, a look-back functionality is incorporated in a scheduler to address this scenario. For example, when a new job is defined, a scheduler can check to see if new input log files have been identified for an earlier timeframe and generate new event log file content.

In some implementations, a scheduler for defining and scheduling jobs to process input log files is configurable with a specialized functionality as opposed to a general purpose scheduler like Cron, an open source scheduler generally known to those skilled in the art. For example, a specialized scheduler as disclosed can be configured to run repeatedly on an hourly basis or at another designated time interval for event log file processing. Some implementations of schedulers disclosed herein can be implemented using one or more processors of a server system and can be configured to repeatedly define and schedule new jobs to output customer-facing log files in a manner that customers do not have to de-duplicate log lines of the files that may arrive later than when a customer expects. Some implementations provide for one or more of the following abilities: reliably tracking partially successful jobs, adding eventually consistent log files using a sequence to prevent duplicate log lines, looking back to determine if a new log file from a previous period should be processed, and/or intelligently scheduling new jobs based on the states of multi-tenant organizations and previous job runs.

In some implementations of the disclosed schedulers, a current job can be scheduled in response to a previous job failing, in response to a previous job being partially successful in the context of a multi-tenant database system, for instance, if the work included in the previous job was successfully completed for 90 tenants out of 100 tenants but failed for the remaining 10 tenants, and/or when additional resources are available. In some implementations, a scheduler can also be configured to generate appropriate jobs for processing log files in one or more scenarios including: the scheduler running for the first time, some of the previous job(s) still running or waiting, all previous jobs being successful, no input log files for a given hour, and/or jobs being manually scheduled. Job type metadata can be generated, stored in or otherwise linked with a job to indicate whether a given job is a new job, a re-run in the case of a partial success, or a failure. In some implementations, a retry limit is imposed on the number of times a partially successful job can be re-run, for instance, to avoid processing log files associated with a corrupt organization. In some implementations, a new base platform object (BPO), described in greater detail below, may be created for each job to identify relevant customer-facing log files for a given job rather than updating a previous BPO. In some implementations, a BPO is treated as immutable, with a new BPO being created each time the scheduler schedules a job. Thus, in most scenarios, customers do not need to apply de-duplication logic to the customer-facing log files.

By way of illustration, an example of a scheduler disclosed herein is configured to run on an hourly basis to make logs available to customers. A sequence of hourly timeframes is used to categorize input log files saved to a database or otherwise identified, e.g., 7:00 am-8:00 am, 8:00 am-9:00 am, 9:00 am-10:00 am, etc. The scheduler runs every hour at a 30 minute offset from the end of each timeframe, e.g., at 8:30 am, 9:30 am, 10:30 am, etc. In some implementations, the scheduler is configured to only process log files created in a specified timeframe, such as 7:00 am-8:00 am. Each time the scheduler runs, the scheduler can include in a job any and all newly identified log files created during the 7:00 am-8:00 am timeframe. For instance, a log file created during the 7:00 am-8:00 am timeframe may not be identified until 9:45 am, so the scheduler will include that log file in the 10:30 am job. The scheduler can be configured to look back a specified number of hours, days, weeks, etc. for input log files created for the timeframe of interest.

In some implementations, the scheduler is configured to run only one job per timeframe, e.g., for a given hour of an hourly sequence. For instance, a single job would be scheduled at 10:30 am to process input log files identified in the timeframe of 9:00 am-10:00 am. In some implementations, if no new input log files are identified in a given timeframe, e.g., 9:00 am-10:00 am, the scheduler skips scheduling a job for that timeframe. Thus, in the current example, there would be no job scheduled at 10:30 am, and the scheduler would run again at 11:30 am.

In some implementations, if a previous job is still running or in a waiting state, and even if an input log file is newly identified, the scheduler will not schedule a new job since invariants could be invalidated if the previous job eventually fails. So at 10:30 am, 11:30 am, 12:30 pm, etc., the scheduler will check whether the previous job has reached its final state before scheduling another job.

FIG. 1 shows a system diagram of an example of architectural components 100 of a database system for processing log files, according to some implementations. Architectural components 100 may provide communications to be transmitted among a variety of different hardware and/or software components. In FIG. 1, architectural components 100 include log processing server 105, user system 110*a*, user system 110*b*, customer-facing log files 115, application server 120, application log files 125, log writer 130, log streaming service 135, and log metadata file 140. In other implementations, the functionality in the architectural components may be implemented in more or less servers.

User systems 110*a* and 110*b* may be any type of computing device. For example, user systems 110*a* and 110*b* may be portable electronic devices such as smartphones, tablets, laptops, wearable devices (e.g., smart watches), etc. User systems 110*a* and 110*b* may be another server or a desktop computer. Additionally, user systems 110*a* and 110*b* may be different types of computing devices. For example, user system 110*a* may be a desktop computer whereas user system 110*b* may be a smartphone. In some implementations, user systems 110*a* and/or 110*b* may be an integration service.

In some implementations, application server 120 may include applications used by different tenants of application server 120. As each client of each tenant interacts with the applications, log entries corresponding to the interactions may be generated by log writer 130 and saved in application log files 125, which may be a content management system, document repository, database or other storage mechanism for log files. At certain times, log streaming service 135 may send one or more log files 125 to the log processing server 105. In some implementations, log files 125, log writer 130, and log streaming service 135 may be integrated within application server 120.

For example, if a tenant's client logs into an application, a corresponding log entry may be stored in a log file in log files 125. The log entry may include a variety of data such as a tenant ID (i.e., a unique identifier associated with the tenant), event type (i.e., a login), location (i.e., the geographic location from which the client logged into the application), timestamp (i.e., when the login occurred), and internal system information (e.g., a server load associated with the login). If another client of another tenant logs into the application, another log entry may be stored in the same log file.

As another example, if a client downloads a file, another log entry may be generated in the same log file or in another log file in log files 125. The new log entry may include data such as the tenant ID, event type (i.e., a download), timestamp (i.e., when the event, or download, occurred), the file name of the downloaded file, and internal system information (e.g., the bandwidth used by the system to provide the download).

At an hourly or other designated interval, such as every 30 minutes, every 2 hours, every 4 hours, etc., log streaming service 135 may obtain the log files 125 and provide the log files to log processing server 105. The log processing server 105 may also receive a log metadata file 140 from the application server. The log metadata file 140 may provide information to the log processing server 105 about the structure of the log files 125 received from the log streaming service 135. Additionally, log metadata file 140 may specify algorithms to be executed to derive data for new data fields from existing data fields in the log entries. The log metadata file 140 can also include algorithms describing the functionality or operations to derive data for the new data fields, as discussed later herein.

Log processing server 105 may receive the log files from log streaming service 135 and, using the log metadata file, parse through the log files and generate customer-facing log files 115 for each of the tenants to be stored in an appropriate database. In some implementations, application server 120 may receive the customer-facing log files 115 from log processing server 105 and then store them in a database. That is, customer-facing log files 115 may include log files specific for each tenant based on the log files provided by application server 120 and the log metadata file. Accordingly, co-mingled data associated with multiple tenants may be split into separate log files.

For example, log files 125 may each include log entries associated with different events. Additionally, each log entry may include a variety of fields associated with the event. As an example, as previously discussed, a download event type log entry may include fields providing data such as the tenant ID, event type, timestamp, file name, and bandwidth information. The log metadata file 140 may indicate which types of log entries (e.g., log entries associated with download events) may be used to generate the customer-facing log files 115. The log metadata file 140 may also indicate which types of fields of the log entries (e.g., event type, timestamp, and file name) may be used to generate the customer-facing log files. That is, the log metadata file 140 may indicate data fields that can be represented in the customer-facing log files and/or the fields that may be purposefully kept away from the tenants.

As such, in some implementations, log processing server 105 receives log files from application server 120 and, using the log metadata file 140, parses through and pares down the data in log files to generate smaller, customer-facing log files with some potentially new types of data that are derived. Log processing server 105 or application server 120 may store the customer-facing log files in customer-facing log files 115, which may be a database or other type of storage. User system 110*a* and user system 110*b* may be able to access their respective log files by application server 120. For example, user system 110*a* may be able to access its own customer-facing log file providing details based on the actions of its clients from log processing server 105. Likewise, user system 110*b* may be able to access its own customer-facing log file providing details of its clients from log processing server 105. As such, a subset of the data from log files of a multi-tenant database system may be provided to the corresponding individual tenants. Additionally, new types of data can be derived. User-side customer-facing log files 190 may provide log processing activities such as scheduling, generating hash, and event storage at the user-side. In some implementations, customer-facing log files 190 may be integrated with one or both of user systems 110*a* and 110*b*.

Figure 2:
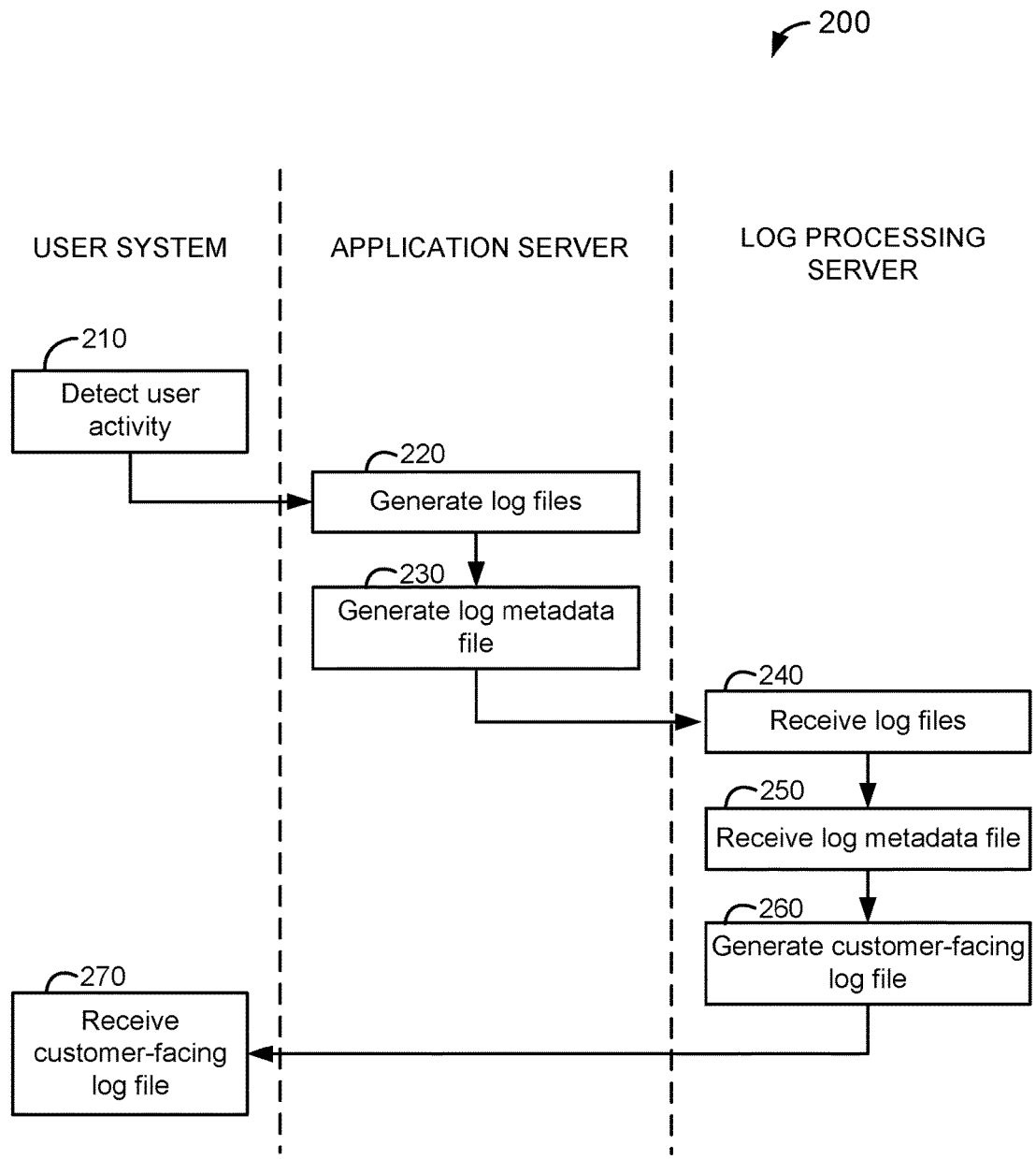
FIG. 2 shows a flowchart of an example of a method 200 for processing log files, according to some implementations.

FIG. 2 shows a flowchart of an example of a method 200 for processing log files, according to some implementations. Method 200 is described with reference to the architectural components of FIG. 1 for illustrative purposes, but method 200 is not limited to the example of FIG. 1.

In FIG. 2, at block 210, a user system 110*a* of FIG. 1 indicates user activity, which may include clicking on a user interface element in a user interface. In FIG. 2, at block 220, application server 120 of FIG. 1 generates log files based on the user activity communicated to the application server from user system 110*a*. These log files may be generated and updated to record user interactions with an application hosted by the application server, as generally described above.

In FIG. 2, at block 230, application server 120 generates a log metadata file. In some implementations, the log metadata file is generated based on a log entry definition file that is provided at the application server, as generally described above. In some implementations, the log entry definition file may be provided by the application server to the log processing server, and the log processing server may generate the log metadata file based on the log entry definition file.

In FIG. 2, at block 240, log processing server 105 receives the log files generated by the application server. In FIG. 2, at block 250, the log processing server receives a log metadata file. In some implementations, the log metadata file includes instructions to MapReduce a job running on a Hadoop system regarding which log entries and log entry fields to extract from the received log files, as well as algorithms that should be executed to derive new data and the code for the algorithms.

In FIG. 2, at block 260, the log processing server generates, using the received log files and the received log metadata file, customer-facing log files and provides the customer-facing log files to one or more tenants of the database system, as generally described herein. At block 270, user system 110*a* can receive the customer-facing log files with newly-derived data in formats that can be used by analytics applications.

The log files may be stored as one or more data objects in a database. By way of example, the user activity and corresponding system events may be associated with an on-demand application hosted by a database system.

Figure 4:
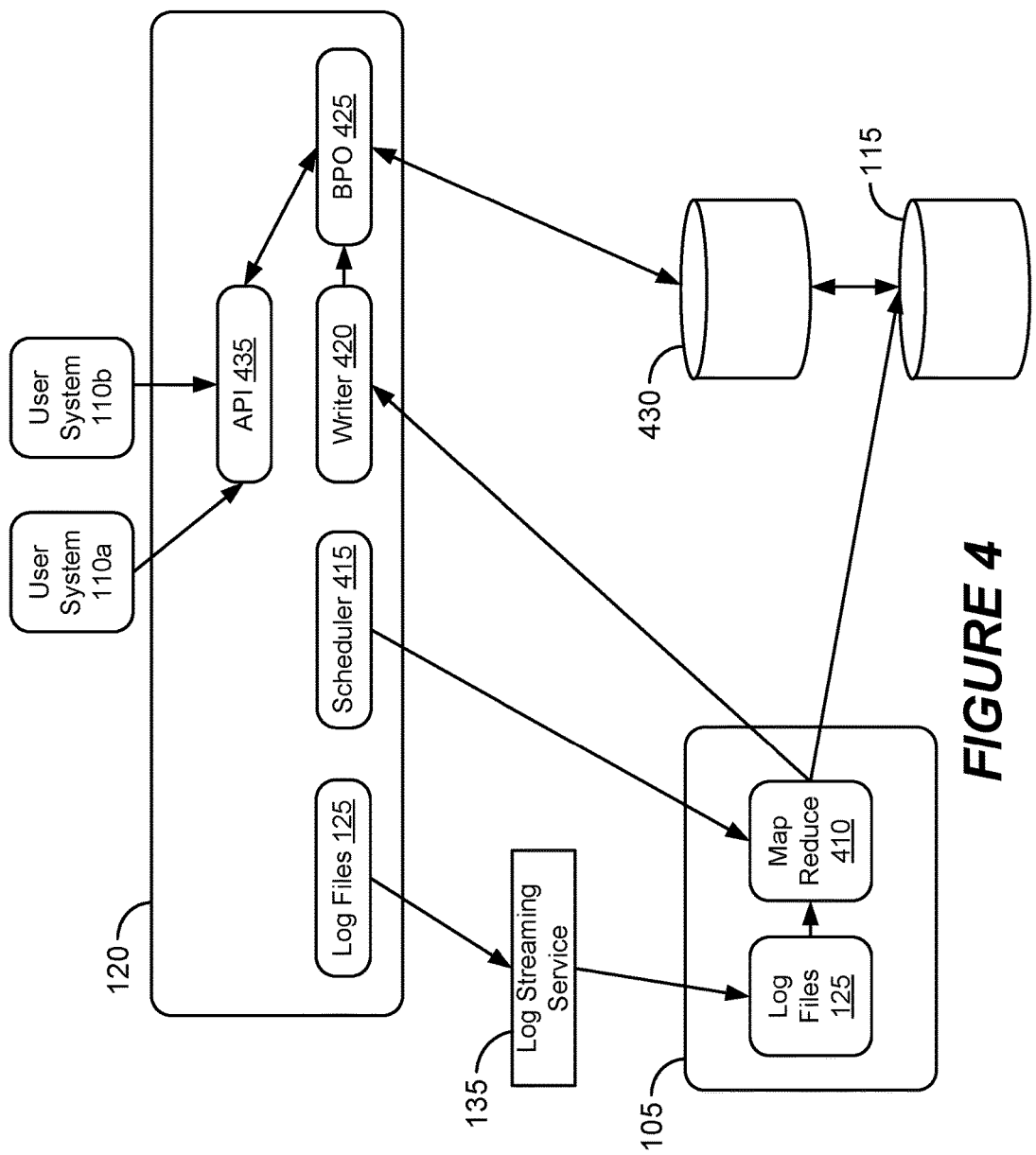
FIG. 4 shows a system diagram of an example of an operating environment for scheduling jobs to process log files, according to some implementations.

For example, at a time when the database system is relatively idle, log files may be transferred from application server 120 of FIG. 1 to log processing server 105 to process the log files. As an example, FIG. 4 shows a system diagram of an example of an operating environment for scheduling jobs to process log files, according to some implementations. In FIG. 4, log streaming service 135 may retrieve log files 125 from application server 120 and "stream" the logs to log processing server 105 every hour or other designated interval. In some implementations, log streaming service 135 may be a separate server, part of application server 120, log processing server 105, etc. In some implementations, the log files may be stored by the log processing server 105 and then analyzed and/or parsed as disclosed herein. However, in other implementations, the log files may be analyzed and parsed on-the-fly as the log files are received by log processing server 105 from log streaming service 135.

Figure 3:
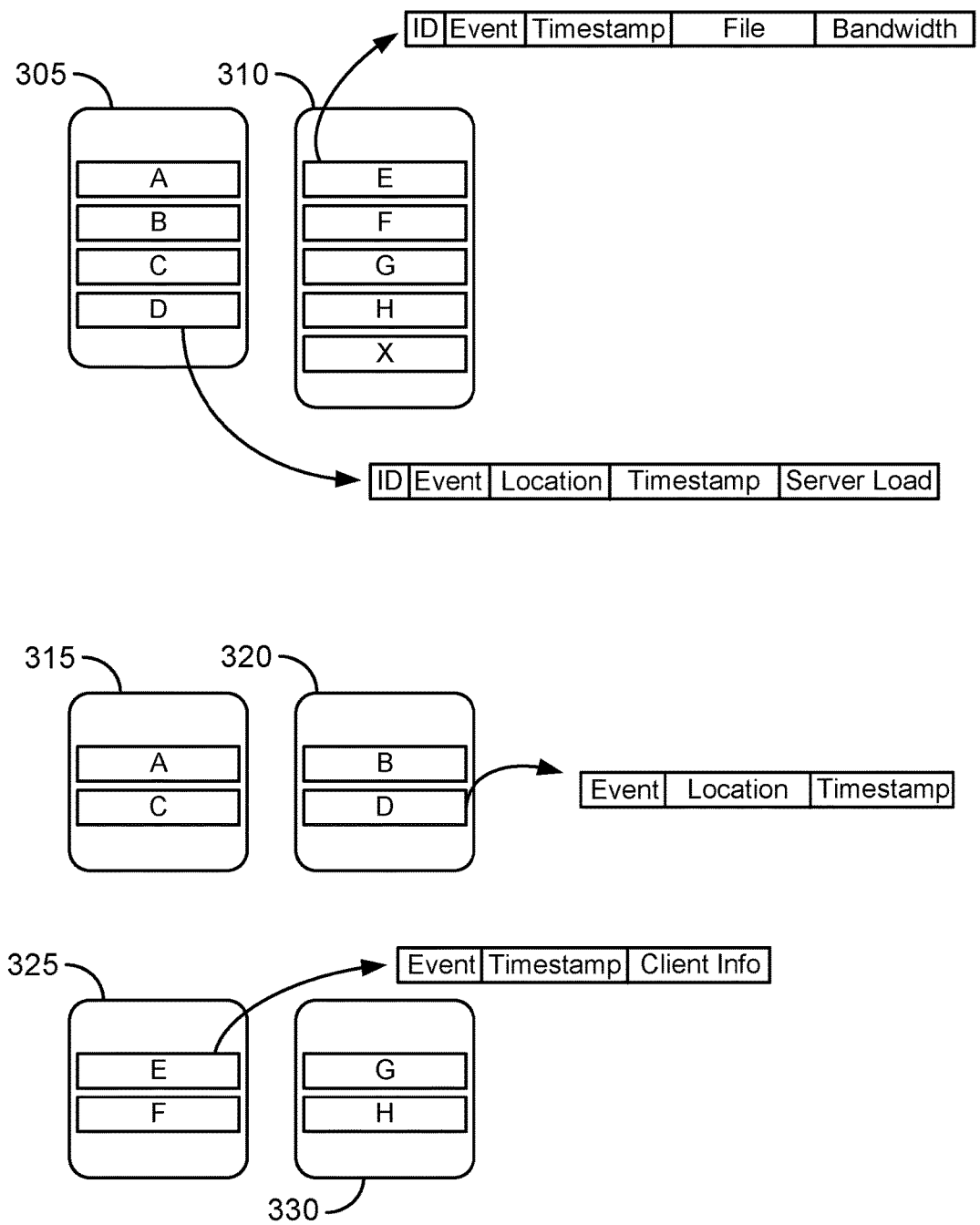
FIG. 3 shows examples of log files, according to some implementations.

FIG. 3 shows examples of log files, according to some implementations. In FIG. 3, an example of a log file 305 may include 4 log entries: log entry A, log entry B, log entry C, and log entry D. Each of the four log entries in log file 305 may be generated when a client of a tenant of a multi-tenant database system logs into an application hosted by the multi-tenant system. As an example, log entries A and C may be created when the clients of a tenant log into an application. In particular, the system may capture or determine that the event occurred and then generate the log entry. Log entries B and D may be created in the same log file 305 when different clients of a different tenant log into an application. Accordingly, a single log file may include log entries from the clients of multiple different tenants of the multi-tenant system.

In this example, each log entry generated upon a client logging in includes five data fields: tenant ID, event, location, timestamp, and server load, as depicted for log entry D in FIG. 3. Tenant ID may be an identifier (e.g., a unique number) associated with the tenant. Different clients of different tenants may generate different corresponding tenant IDs in the respective log entries. For example, log entry A and log entry C may both have the same tenant ID because the client actions are associated with the same tenant. Likewise, log entry B and log entry D may both have another tenant ID because the client actions are associated with another tenant. The event data field may indicate the event type or user action that resulted in the generation of the log entry, for example "login" in the example of FIG. 3. The location data field of the log entries in log file 305 may indicate a geographic location (e.g., country, state, city, etc.) from which the clients are logging in. The timestamp data field may indicate when the client action was performed. The server load data field may indicate the server load at the time when the client action was performed.

Log file 310 includes five log entries: log entry E, log entry F, log entry G, log entry H, and log entry X. Each of the five log entries in log file 310 may also be generated upon a client action by the multi-tenant system, similar to log file 305. However, rather than each log entry in log file 310 being generated upon a client logging into an application, log entries E-H in log file 310 may be generated upon a client downloading a file, and log entry X may be generated upon a client using an API. Accordingly, log file 310 includes co-mingled data from multiple tenants as well as co-mingled log entries of different types (e.g., download and API event types). Each of the log entries E-H in log file 310 includes five data fields: tenant ID, event, timestamp, file, and bandwidth. Tenant ID may indicate the particular tenant associated with the client performing the action that result in the generated log entries. "Event" may indicate a type of action that led to the generation of the log entry, for example, "download." Similar to log file 305, timestamp may be the time when the action was performed. The file data field may indicate the name of the file that was downloaded by the client. Lastly, the bandwidth data field may indicate the bandwidth used by the system to allow for the client to download the file. By contrast, log entry X may include different data fields than log entries E-H because log entry X is for a different event type (i.e., an API use in this example).

A server of the database system generates or updates a metadata file. The metadata file includes information indicating one or more approved entry types and approved data associated with each approved entry type. In some implementations, the metadata file is an extensible markup language (XML) file. The metadata file may correspond to particular log files generated from user interactions with an application.

In some implementations, the metadata file is generated by an application server based on a log entry definition file comprising descriptive data describing each entry of the log file and comprising approval data identifying approved entry types and approved data. In some implementations, the log entry definition file may be an XML file provided by a developer or administrator of the on-demand application provided by the database system.

As an example, a portion of a log entry definition file that may be used to generate the metadata file exemplified above may be the following:

```
<log-record component="ap" subtype="out" class="Callout" event_log_type="APEX_CALLOUT_EVENT">
  <field type="String" name="type" event_log_field="TYPE" desc="callout type"/>
  <field type="Boolean" name="success" event_log_field="SUCCESS" desc="whether call was successful"/>
  <field type="Number" name="statusCode" desc="HTTP status code"/>
  <field type="Number" name="responseSize" desc="size of response"/>
  <field type="EscapedString" name="url" event_log_field="URL" has_password="true" desc="url"/>
</log-record>
```

In this example, the log entry definition file provides information for all of the fields that appear in an APEX_CALLOUT_EVENT log entry, as well as the order in which those fields appear. The five fields in this log entry are, in the following order, "type," "success," "statusCode," "responseSize," and "url." The log entry definition file also indicates which of these fields should be included in the customer-facing log file by providing the attribute "event_log_field" in the <field> tags for the desired fields. The fields that include an "event_log_field" attribute will appear in the metadata file in a <field> section, and the <field> section of the metadata file will have the value of the "event_log_field" attribute as the <name>. For example, the log entry definition file above indicates that the first ("type"), second ("success"), and fifth ("url") fields of the log entry should be provided in the metadata file with the names, "TYPE," "SUCCESS," and "URL," respectively. Moreover, the <position> value in the resulting metadata file is based on the position of the <field> tag in the <log-record> definition of the log entry definition file. As such, the positions for the fields indicated in the metadata file above are 1, 2, and 5, respectively.

In some implementations, returning to FIG. 1, the log processing server 105 receives the log file from the log streaming service 135 and the log metadata file generated by the application server as described above. In some implementations, the log processing server 105 may receive the log entry definition file and generate the metadata file based on the log entry definition file. Generation of the metadata file from the log entry definition file may be performed by either the application server 120 or the log processing server 105.

A server of the database system generates or updates, based at least on the log file and the metadata file, one or more customer-facing log files. The customer-facing log files may be stored in a content file system, and one or more pointers to the customer-facing log files may be stored as one or more data objects in a database of the database system. Each customer-facing log file may be associated with a corresponding customer entity capable of being serviced by the database system, and each customer-facing log file may include a subset of the entries and a subset of the data items of at least one of the entries. In some implementations, each customer-facing log file is associated with a version of the application hosted by the database system.

In some implementations, the customer entity may be a tenant of the multi-tenant database system hosting the on-demand application that users of the tenant are interacting with. The tenant may be provided with a customer-facing log file that contains a relevant subset of the log entries and log entry data, which is indicated by the approved entry types and approved data provided in the metadata file. As described above, the metadata file provides instructions to the log processing server for determining which log entries to select from the log file, and which fields to select from each log entry.

A server of a database system captures a series of system events as the entries of a log file. The various types of system events that may be captured in the log file are described above. In some implementations, the database is a multi-tenant system, in which the clients (or users) of the tenants using the applications hosted by the multi-tenant system are performing actions that may result in a log entry being generated in a log file hosted by the system. Each log entry may appear as a line in the log file.

The server of the database system access a log file storing data entries identifying system events corresponding to user activity, as generally described above. The server of the database system identifies a log entry definition file associated with the log file. The log entry definition file may be stored as a data object in a database of the database system. The log entry definition file includes descriptive data describing each entry of the log file and includes approval data identifying approved entry types and approved data. As discussed above, in some implementations, the descriptive data may provide a description of log entry types that may appear in the log files for a particular application. The description of a log entry type may include a list of fields that appear in order in a log entry having the log entry type. The server of the database system generates or updates the metadata file based on the descriptive data and approval data of the log entry definition file, as generally described above. The server of the database system selects a subset of the log file entries based on the approved entry types and based on a corresponding customer entity.

In some implementations, the selection of the subset of entries may be initiated by scheduler 415 of FIG. 4 at a time after log streaming service 135 provides the log files to log processing server 105. For example, scheduler 415 may be set up to inform map reduce logic 410 when to begin. In some implementations, if log streaming service 135 transfers logs from application server 120 to log processing server 105 at 2 A.M., then scheduler 415 may inform map reduce logic 410 to begin at 2:30 A.M. (i.e., a time later than the time when log streaming service 135 provides the log files to log processing server 105). In some implementations, the time scheduler 415 may inform map reduce logic 410 to begin may be based on how many logs log streaming service 135 needs to provide to log processing server 105. For example, a higher number of logs to be provided may have a later map reduce start time than a lower number of logs. In some implementations, scheduler 415 is configurable as described above to run every hour or at another designated interval to interact with map reduce logic 410 and generate customer-facing log files 115 in the form of comma separated value (CSV) files for a particular tenant and log entry type. For example, the format of the CSV file can be: OrgId-LogType-yyyymmddHH. with each log entry on its own line (e.g., of a text file) with each data field separated by a comma.

For each selected entry, the server of the database system selects a subset of the data items based on the approved data. For example, in FIG. 4, map reduce logic 410 may also reduce the number of data fields of the log entries that were selected. Similar to the system administrator designating approved log entries, particular data fields may also be approved, for example, in the same or another XML data file with designations or attributions of the approved data fields. Returning to FIG. 4, in some implementations, log processing server 105 may include map reduce logic 410 for selecting the subset of the log file entries. In particular, map reduce logic 410 may analyze the received log files 125 and determine which log entries should be provided to particular clients.

In some implementations, customer-facing log files may then be generated. In particular, customer-facing log files corresponding to the tenants may be generated based on the selected log entries and data fields.

For example, in FIG. 3, log files 315, 320, 325, and 330 may be customer-facing log files with data corresponding to the selected log entries and data fields. That is, each log file 315, 320, 325, and 330 may include a subset of the total data of log files 305 and 310. Log file 315 includes log entries A and C. Log file 320 includes log entries B and D. Log file 325 includes log entries E and F. Log file 320 includes entries G and H. The entries may be included in the log files 315, 320, 325, and 330 because the entries were selected. Four customer-facing log files (i.e., log files 315, 320, 325, and 330) may be created from the two log files 305 and 310 because each tenant may receive a log file without any entries associated with another tenant (e.g., a log entry generated based on an action by another tenant's client). For example, in FIG. 3, log files 315 and 325 may include actions of one tenant's clients whereas log files 320 and 330 may include actions of another tenant's clients.

In FIG. 3, each tenant may have two customer-facing log files generated because two log files 305 and 310 were parsed separately. However, in other implementations, the data in log files 315 and 325 may be provided in a single customer-facing log file. Likewise, the data in log files 320 and 330 may also be provided in a single customer-facing log file.

In FIG. 3, log entry X from log file 310 is not provided in any of the customer facing log files 315, 320, 325, and 330 because, as previously discussed, log entry X may be associated with an event type that is not approved to be provided to the tenants, and therefore, would not be selected.

Additionally, in FIG. 3, the log entries in log files 315, 320, 325, and 330 may also include fewer data fields than the corresponding entries in log files 305 and 310. In FIG. 3, log entry D in log file 320 includes fewer data fields than log entry D in log entry 305. In particular, tenant ID and server load data fields are not provided in the customer-facing log file because they were not specified as being approved, as previously discussed. Likewise, log entry E in log file 325 also includes fewer data fields than log entry E in data file 310 for similar reasons.

The server of the database system stores pointers identifying the customer-facing log files as at least one data object in a database. Each pointer stored by the database system may indicate a location of a corresponding customer-facing log file.

Additionally, returning to FIG. 4, map reduce logic 410 may provide data to writer 420 of application server 120 with details on the customer-facing log files. Writer 420 may provide the details to a base platform object (BPO) 425, which may create a data object by writing a row in database 430 with a pointer (e.g., a URL) to the appropriate log files stored in customer-facing log file system. For example, BPO 425 may write in database 430 a URL or data path for each of the customer-facing log files so that the tenant may later be able to access the customer-facing log files. Additionally, the tenant ID for each of the customer-facing log files may also be stored in the rows.

In some implementations, the customer entities may be capable of accessing the customer-facing log files using an API providing access to the pointers. For example, the tenant may access the customer-facing log files by using API 435. For example, the tenant may use the API 435 to contact BPO 425 to find the pointers for its customer-facing log files based on determining the pointers in a row with a corresponding tenant ID. The tenant may then be provided the customer-facing log files from customer-facing log files 115 based on using the pointers. As a result, BPO 425 allows a user to access, via the API, a database table with the pointers to the stored customer-facing log files. In some implementations, in addition to the pointers, users may also be provided attributes of the customer-facing log files such length (i.e., the file size), log date, and type of log.

In some implementations, the customer-facing log files generated by map reduce logic 410 may be CSV files with each log entry on its own line (e.g., of a text file) with each data field separated by a comma. As a result, tenants may receive the CSV files with the log entries and data fields and use the data to develop their own applications. For example, tenants may be able to plot on a map the geographical locations where clients are downloading files from and determine whether data leakage problems exist, for example, by finding out that a file was downloaded from an unsecure location. Tenants may also use the customer-facing log files for compliance and auditing purposes. Additionally, comingled data may be split into tenant-specific data in tenant-specific customer-facing log files. As such, the customer-facing log files may be integrated into third-party applications developed by applications developed by the tenants.

In some implementations, only specific tenants may be provided with customer-facing log files. For example, tenants may pay to receive customer-facing log files, and therefore, the tenant ID data field in log entries may be analyzed to determine whether the tenant ID belongs to a tenant that pays for the service. Tenants who pay for the service may have their customer-facing log files stored in customer-facing log files 115 and access the logs through API 435. Clients who do not pay may not have any log files in customer-facing log files 115, or may not be able to access any sort of log file in customer-facing log files 115.

The data processed from the customer-facing log files can be visualized, for example, in graphs, charts, infographics, text, etc. in an analytics application. The visualizations can be updated to reflect the data in the new log entries. As a result, the analytics application can be provided with the latest data from the customer-facing log files.

Figure 5:
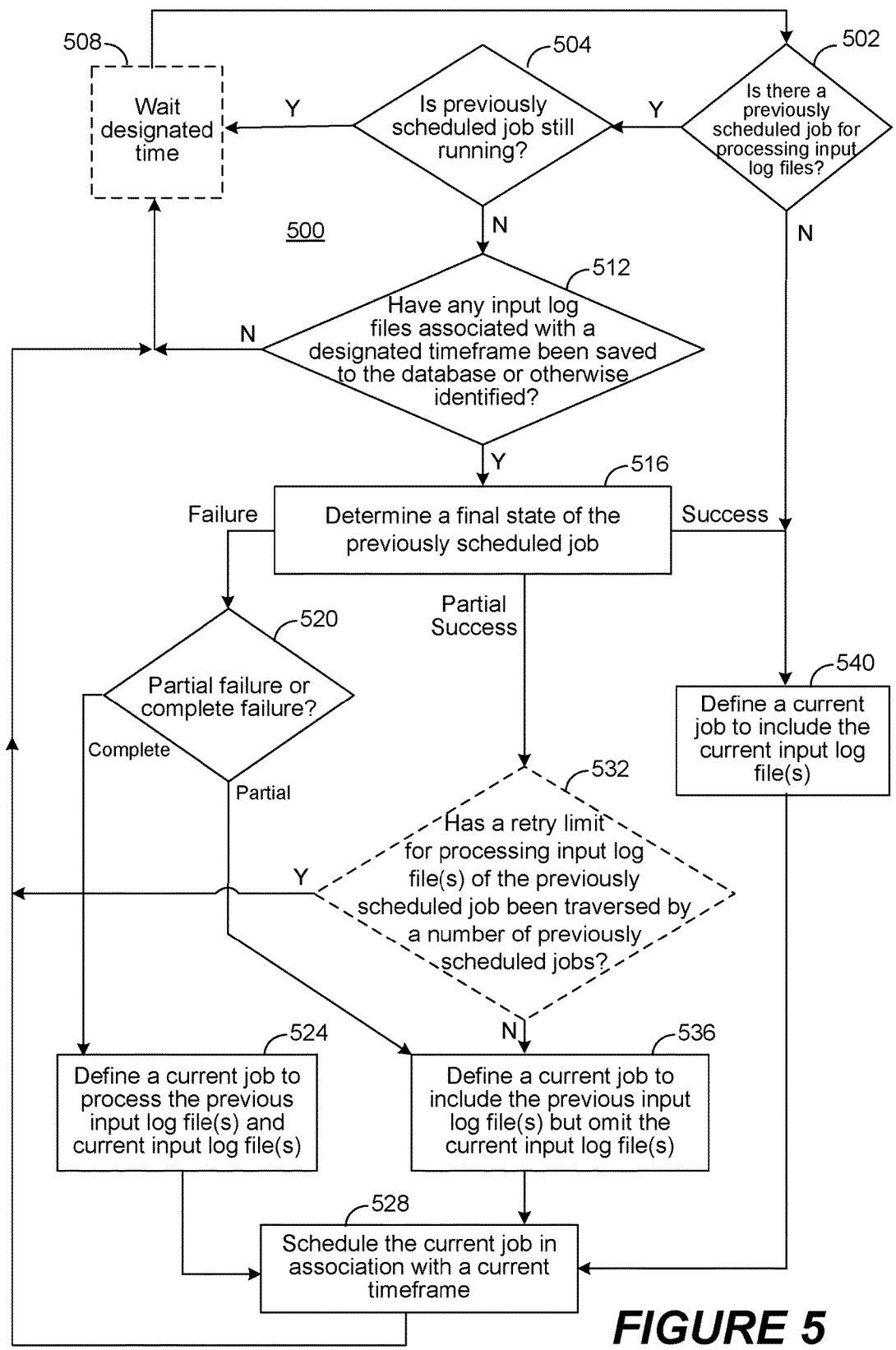
FIG. 5 shows a flowchart of an example of a method 500 for scheduling jobs to process log files, according to some implementations.

FIG. 5 shows a flowchart of an example of a method 500 for scheduling jobs to process log files, according to some implementations. Some operations of FIG. 5 are described as being performed by scheduler 415 of FIG. 4, although method 500 is not limited to the environment of FIG. 4. In FIG. 5, at 502, scheduler 415 of FIG. 4 determines whether any previously scheduled jobs for processing input log files exist. If not, method 500 proceeds to 540, described in greater detail below, to define a current job to include current input log files. At 502, if there is a previously scheduled job, method 500 proceeds to 504, at which scheduler 415 of FIG. 4 determines whether a previously scheduled job for processing input log files is still running or queued to be run. For example, input log files to scheduler 415 can be in the form of log files 125. When a previously scheduled job has not reached its final state, at 504 of FIG. 5, method 500 repeats operation 504 to check again for any previously scheduled jobs still running. In some implementations, before repeating 504, scheduler 415 waits for a designated time at 508. The wait time can approximately match the interval at which the scheduler runs. For example, when scheduler 415 is configured to run hourly, the wait time at 508 may be approximately one hour.

In FIG. 5, at 504, when there are no previously scheduled jobs still being executed or in a queue to be executed, method 500 proceeds to 512 to determine whether any new input log files associated with a designated timeframe of a sequence of timeframes have been saved to a database or otherwise identified since the last time a job was scheduled. For example, at 512, scheduler 415 of FIG. 4 can be configured to read log file names and associated last modified times for each hour or other interval from an HDFS. At 512 of FIG. 5, if scheduler 415 does not detect any input log files, method 500 returns to 508 or directly to 504. At 512, when any input log files are detected, method 500 proceeds to 516, where scheduler 415 ascertains a final state of the previously scheduled job. Job type metadata as described herein can be checked for the determination at 516, as further explained below with reference to FIG. 6. As mentioned above, the final state can be in the form of a failure, a partial success or a success. Each of these scenarios is described and illustrated in the examples below.

In FIG. 5, in the case of a failure of the previously scheduled job at 516, method 500 proceeds to operation 520, where scheduler 415 determines whether the failure was a partial failure or complete failure. In the case of a partial failure, method 500 proceeds to 536 to define a current job to include the input log files of the previously scheduled job but omit the current input files detected at 512. Operation 536 is also described below. At 520, in the case of a complete failure, method 500 proceeds to 524, where scheduler 415 defines a current job to process the input files of the previously scheduled job and current input log files detected at 512. After the current job is generated at 524, the current job can be scheduled for execution by one or more processors at 528. As illustrated in the examples below, the current job is often scheduled at a time in association with a current timeframe of the sequence of hourly timeframes, for instance, at 9:30 am for the timeframe of 8:00 am-9:00 am. In some implementations, a record representing the current job is created and stored in a jobs table to enqueue the current job for processing by one or more servers of a database system. Following the scheduling of a current job at 528, method 500 returns to 508 or directly to 504 described above.

In FIG. 5, returning to 516, the final state of the previously scheduled job can be determined as a partial success, in which case method 500 proceeds to optional operation 532, where a retry limit can be checked. In particular, at 532, it is determined whether a retry limit for processing input log files of the previously scheduled job has been traversed by a number of previously scheduled jobs. That is, in some scenarios, it is desirable to limit the number of retries for processing a given input log file when the file is corrupt or there is some other irreconcilable fault. In implementations in which a retry limit is checked at 532, when such a retry limit has been exceeded, method 500 returns to 508 or directly to 504. At 532, in situations where the retry limit has not been exceeded, method 500 proceeds to 536, where scheduler 415 defines a current job to include the input log files of the previously scheduled job but omit the current input files detected at 512. After 536, method 500 proceeds to 528 for scheduling the current job, as described above.

In FIG. 5, returning to 516, when the final state of the previously scheduled job is identified as a success, method 500 proceeds to 540, where the current job is defined to include the current input log files detected at 512. Such a job can then be scheduled at 528, as described above.

Figure 6:
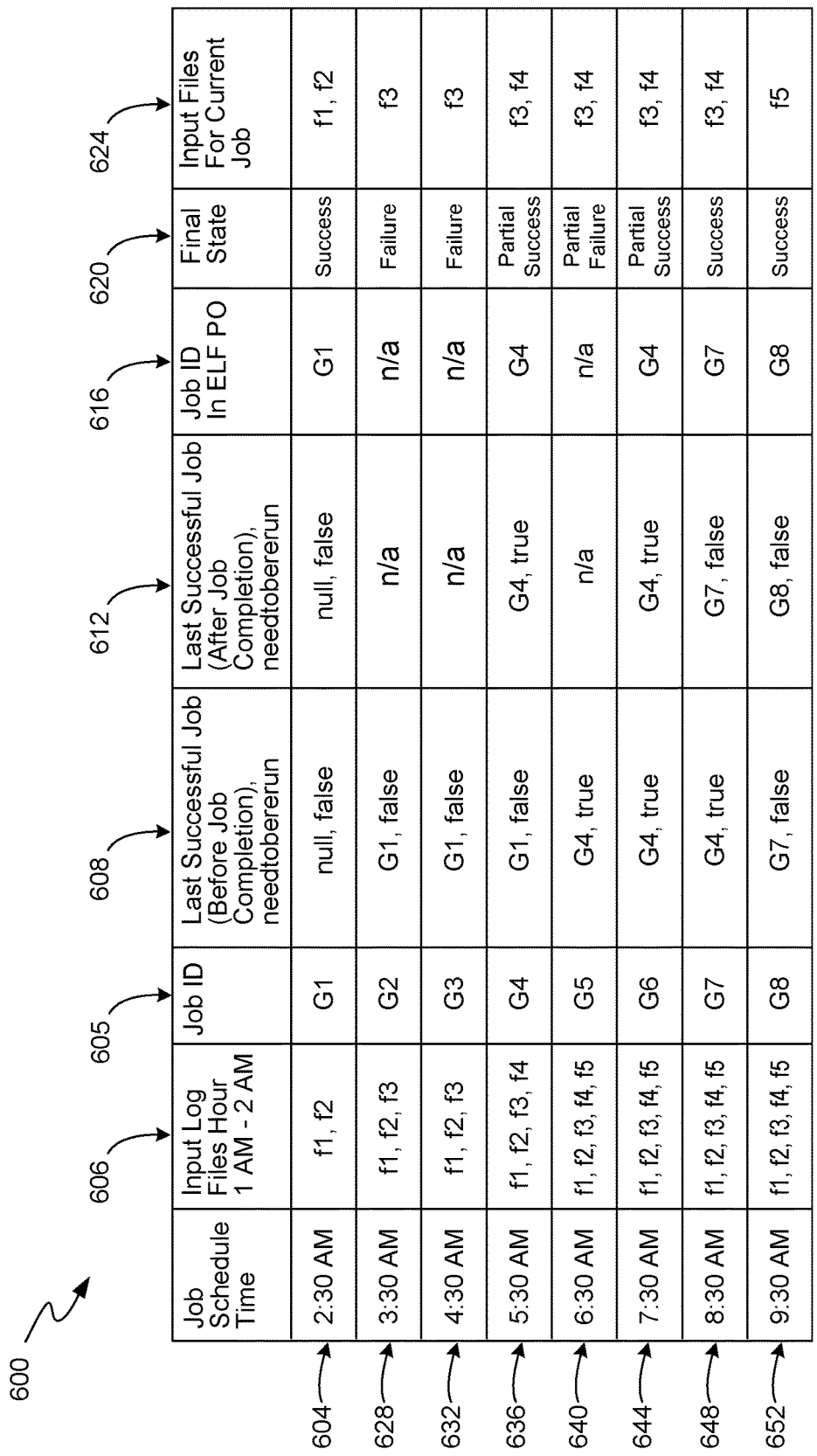
FIG. 6 shows an example of a database table 600 listing jobs and associated data for scheduling jobs to process log files, according to some implementations.

FIG. 6 shows an example of a database table 600 listing jobs and associated data for scheduling jobs to process log files, according to some implementations. In the example of FIG. 6, input log files generated during a timeframe of 1 AM-2 AM are processed by scheduler 415 of FIG. 4. In this example, scheduler 415 has been configured to run repeatedly at an hourly interval plus a 30 minute offset. Thus, row 604 shows that scheduler 415 runs for the 1st time at approximately 2:30 AM to generate an initial job with an ID of G1, reflected in column 605. As shown in column 606, input log files f1 and f2 associated with the timeframe of 1 AM-2 AM were generated during that timeframe. Job type metadata parameters are stored in a job as described above to identify characteristics of current and previous jobs. Column 608 of FIG. 6 shows examples of two such parameters indicating characteristics before a current job has been completed. In particular, column 608 identifies a last successful job and includes a "needtobererun" flag as to whether the last job needs to be re-run. The job type metadata parameters identified in column 612 include an identification of the last successful job after the current job has been completed as well as a "needtobererun" flag indicating whether the current job needs to be re-run. Thus, in the example of row 604, since job G1 is the initial job scheduled for the timeframe of 1 AM-2 AM, the last successful job parameter of column 608 is null, and the "needtobererun" parameter is false. In column 612, since job G1 has a final state of success as indicated in column 620, the "needtobererun" parameter of column 612 is false.

When current job G1 is created, the input log files to be processed in job G1 are identified in column 624 for row 604 of FIG. 6. In the example of row 604, these input log files match the input files identified in column 606. This is the result of there being no previously scheduled jobs before job G1. After job G1 is scheduled, it is determined using method 500 of FIG. 5 that job G1 has a final state of success, as shown in column 620 of FIG. 6. Thus, in row 604, a new BPO as described above is created for the G1 job, and the G1 job ID is identified in the BPO, as shown in column 616 of FIG. 6.

In row 628 of FIG. 6, when scheduler 415 runs again at 3:30 AM, an additional input log file f3 as shown in column 606 has been identified. In column 608, the last successful job parameter identifies G1 since job G1 had a final state of success, and the "needtobererun" parameter of column 608 is false. Thus, in row 628, job G2 is defined to include only input log file f3, as shown in column 624. This is because input log files f1 and f2 were successfully processed in job G1. In row 628, when job G2 is scheduled, it is determined using method 500 of FIG. 5 that job G2 has a final state of failure, as shown in column 620. Thus, the last successful job and "needtobererun" parameters of column 612 are not applicable. Also, since G2 was a failure, no job ID is stored in a BPO 425, as shown in column 616.

In FIG. 6, in row 632, job scheduler 415 runs again at approximately 4:30 AM. In the example of row 632, no new input log files associated with timeframe 1 AM-2 AM have been detected in column 606. Since previous job G2 failed, a current job G3 is defined to include the same input log file f3, which was supposed to be processed as part of job G2, as shown in column 624. Thus, in row 632, job G3 is a re-run of job G2, as indicated by column 624. The parameters in columns 608 and 612 match those of row 628. As with job G2, since job G3 ends up with a final state of failure, as indicated in column 620, there is no job ID to identify in a BPO 425, as shown in column 616.

In row 636 of FIG. 6, when scheduler 415 runs again at approximately 5:30 AM, an additional input log file f4 is identified, as shown in column 606. Since previous job G3 was a failure, a current job G4 is defined to include both new input log file f4 and previous input file f3, since attempts to process f3 in jobs G2 and G3 failed, as indicated by column 624. In row 636, job type metadata parameters in column 608 match those of rows 628 and 632, since G1 was the last successful job before job G4 has been completed. When job G4 is run and reaches completion, the final state of job G4 is a partial success, as indicated in column 620. In this example, since G4 is a partial success in execution, the last successful job parameter of column 612 identifies job G4, and the "needtobererun" parameter of column 612 has a state of true, indicating that job G4 is to be re-run. A new BPO is created, as indicated in column 616, and the BPO includes a reference to G4 as the job ID.

In row 640 of FIG. 6, when scheduler 415 of FIG. 4 runs again at 6:30 AM, an additional input log file f5 is identified, as shown in column 606. Nonetheless, since the attempt to process input files f3 and f4 in job G4 was partially successful, current job G5 in row 640 is defined to again include input files f3 and f4 but exclude newly identified input file f5, as shown in column 624. The last successful job parameter and "needtobererun" parameter of column 608 for row 640 are G4 and true, respectively. In this example, the scheduling and running of job G5 results in a final state of partial failure, as identified in column 620 for row 640. Thus, the last successful job parameter and "needtobererun" parameter of column 612 for row 640 are not applicable. In the case of a partial failure, no BPO is created, so there is no job ID to identify in column 616 for row 640.

In row 644 of FIG. 6, scheduler 415 of FIG. 4 runs again at 7:30 AM. In this example, a current job G6 is again defined to include only input files f3 and f4 since attempts to process f3 and f4 in jobs G4 and G5 were a partial success and a partial failure. That is, input file f5, identified in rows 640 and 644 in column 606, is again omitted from job G6. Parameters in column 608 for row 644 match those of row 640. In row 644, job G6 is run and reaches a final state of partial success, as indicated in column 620. Thus, parameters in column 612 for row 644 match those of row 640. The job ID identified in a new BPO 425 is again G4, as shown in column 616.

In row 648 of FIG. 6, when scheduler 415 runs again at 8:30 AM, no additional input log files in column 606 are detected. Since all previous attempts to process input files f3 and f4 were failures, partial failures or partial successes, current job G7 is defined to again only include input files f3 and f4, as shown in column 624 for row 648. That is, input file f5 is again omitted from the current job. In this example, when job G7 is run, the final state of job G7 is a success, as shown in column 620. Thus, while metadata parameters in column 608 for row 648 match those of row 644, the last successful job parameter and "needtobererun" parameter of column 612 for row 648 are G7 and false, respectively. The job ID identified in a new BPO 425 is G7, as shown in column 616 for row 648.

In row 652 of FIG. 6, when scheduler 415 runs again at 9:30 AM, since the last attempt to process input log files f3 and f4 was successful in job G7, a current job G8 is defined to include any previously omitted files such as f5 and any newly identified files in column 606. In this example, since no files in addition to f5 have been identified in column 606, a current job G8 is defined to include only f5, as shown in column 624. Metadata parameters of column 608 for row 652 indicate that the last successful job was G7, which does not need to be re-run since G7 was a success. When current job G8 is scheduled and run, the final state of G8 is a success, as shown in column 620 for row 652. Thus, metadata parameters of column 612 reflect that the last successful job was G8, and G8 does not need to be re-run. A new BPO is created and associated with job G8, as shown in column 616 for row 652.

Figure 7A:
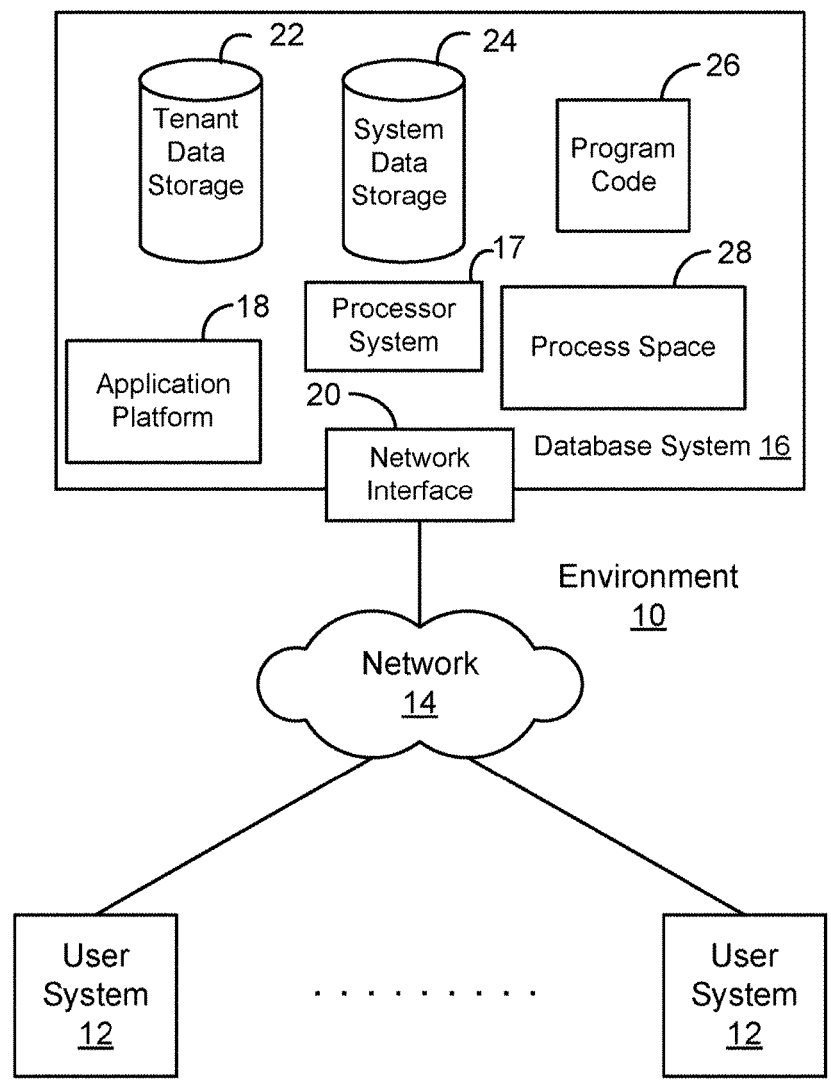
FIG. 7A shows a block diagram of an example of an environment 10 in which an on-demand database service can be used in accordance with some implementations.

FIG. 7A shows a block diagram of an example of an environment 10 in which an on-demand database service can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

A user system 12 may be implemented as any computing device(s) or other data processing apparatus such as a machine or system used by a user to access a database system 16. For example, any of user systems 12 can be a handheld and/or portable computing device such as a mobile phone, a smartphone, a laptop computer, or a tablet. Other examples of a user system include computing devices such as a work station and/or a network of computing devices. As illustrated in FIG. 7A (and in more detail in FIG. 7B) user systems 12 might interact via a network 14 with an on-demand database service, which is implemented in the example of FIG. 7A as database system 16.

An on-demand database service, implemented using system 16 by way of example, is a service that is made available to users who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, when a salesperson is using a particular user system 12 to interact with system 16, the user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the Internet. The Internet will be used in many of the examples herein. However, it should be understood that the networks that the present implementations might use are not so limited.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 7A, implements a web-based CRM system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

Figure 7B:
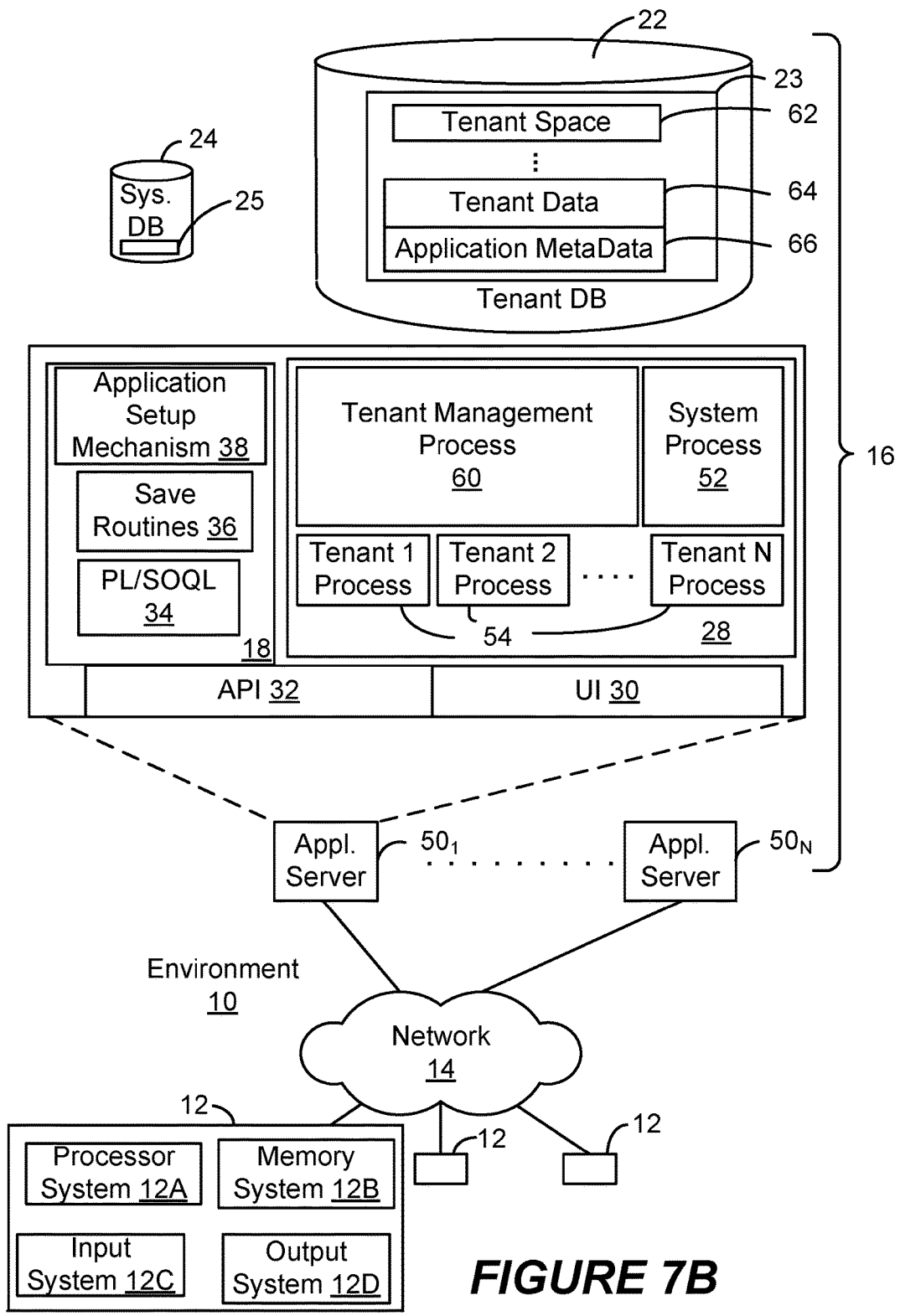
FIG. 7B shows a block diagram of an example of some implementations of elements of FIG. 7A and various possible interconnections between these elements.

One arrangement for elements of system 16 is shown in FIGS. 7A and 7B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 7A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a GUI provided by the browser on a display (e.g., a monitor screen, LCD display, OLED display, etc.) of the computing device in conjunction with pages, forms, applications and other information provided by system 16 or other systems or servers. Thus, "display device" as used herein can refer to a display of a computer system such as a monitor or touch-screen display, and can refer to any computing device having display capabilities such as a desktop computer, laptop, tablet, smartphone, a television set-top box, or wearable device such Google Glass® or other human body-mounted display apparatus. For example, the display device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to one type of computing device such as a system including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

FIG. 7B shows a block diagram of an example of some implementations of elements of FIG. 7A and various possible interconnections between these elements. That is, FIG. 7B also illustrates environment 10. However, in FIG. 7B elements of system 16 and various interconnections in some implementations are further illustrated. FIG. 7B shows that user system 12 may include processor system 12A, memory system 12B, input system 12C, and output system 12D. FIG. 7B shows network 14 and system 16. FIG. 7B also shows that system 16 may include tenant data storage 22, tenant data 23, system data storage 24, system data 25, User Interface (UI) 30, Application Program Interface (API) 32, PL/SOQL 34, save routines 36, application setup mechanism 38, application servers $50_1$-$50_N$, system process space 52, tenant process spaces 54, tenant management process space 60, tenant storage space 62, user storage 64, and application metadata 66. In other implementations, environment 10 may not have the same elements as those listed above and/or may have other elements instead of, or in addition to, those listed above.

User system 12, network 14, system 16, tenant data storage 22, and system data storage 24 were discussed above in FIG. 7A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 7B, system 16 may include a network interface 20 (of FIG. 7A) implemented as a set of application servers 50, an application platform 18, tenant data storage 22, and system data storage 24. Also shown is system process space 52, including individual tenant process spaces 54 and a tenant management process space 60. Each application server 50 may be configured to communicate with tenant data storage 22 and the tenant data 23 therein, and system data storage 24 and the system data 25 therein to serve requests of user systems 12. The tenant data 23 might be divided into individual tenant storage spaces 62, which can be either a physical arrangement and/or a logical arrangement of data. Within each tenant storage space 62, user storage 64 and application metadata 66 might be similarly allocated for each user. For example, a copy of a user's most recently used (MRU) items might be stored to user storage 64. Similarly, a copy of MRU items for an entire organization that is a tenant might be stored to tenant storage space 62. A UI 30 provides a user interface and an API 32 provides an application programmer interface to system 16 resident processes to users and/or developers at user systems 12. The tenant data and the system data may be stored in various databases, such as one or more Oracle® databases.

Application platform 18 includes an application setup mechanism 38 that supports application developers' creation and management of applications, which may be saved as metadata into tenant data storage 22 by save routines 36 for execution by subscribers as one or more tenant process spaces 54 managed by tenant management process 60 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 66 for the subscriber making the invocation and executing the metadata as an application in a virtual machine.

Each application server 50 may be communicably coupled to database systems, e.g., having access to system data 25 and tenant data 23, via a different network connection. For example, one application server $50_1$ might be coupled via the network 14 (e.g., the Internet), another application server $50_{N-1}$ might be coupled via a direct network link, and another application server $50_N$ might be coupled by yet a different network connection. Transfer Control Protocol and Internet Protocol (TCP/IP) are typical protocols for communicating between application servers 50 and the database system. However, it will be apparent to one skilled in the art that other transport protocols may be used to optimize the system depending on the network interconnect used.

In certain implementations, each application server 50 is configured to handle requests for any user associated with any organization that is a tenant. Because it is desirable to be able to add and remove application servers from the server pool at any time for any reason, there is preferably no server affinity for a user and/or organization to a specific application server 50. In one implementation, therefore, an interface system implementing a load balancing function (e.g., an F5 Big-IP load balancer) is communicably coupled between the application servers 50 and the user systems 12 to distribute requests to the application servers 50. In one implementation, the load balancer uses a least connections algorithm to route user requests to the application servers 50. Other examples of load balancing algorithms, such as round robin and observed response time, also can be used. For example, in certain implementations, three consecutive requests from the same user could hit three different application servers 50, and three requests from different users could hit the same application server 50. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 50 to request and update system-level and tenant-level data from system 16 that may involve sending one or more queries to tenant data storage 22 and/or system data storage 24. System 16 (e.g., an application server 50 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 8A:
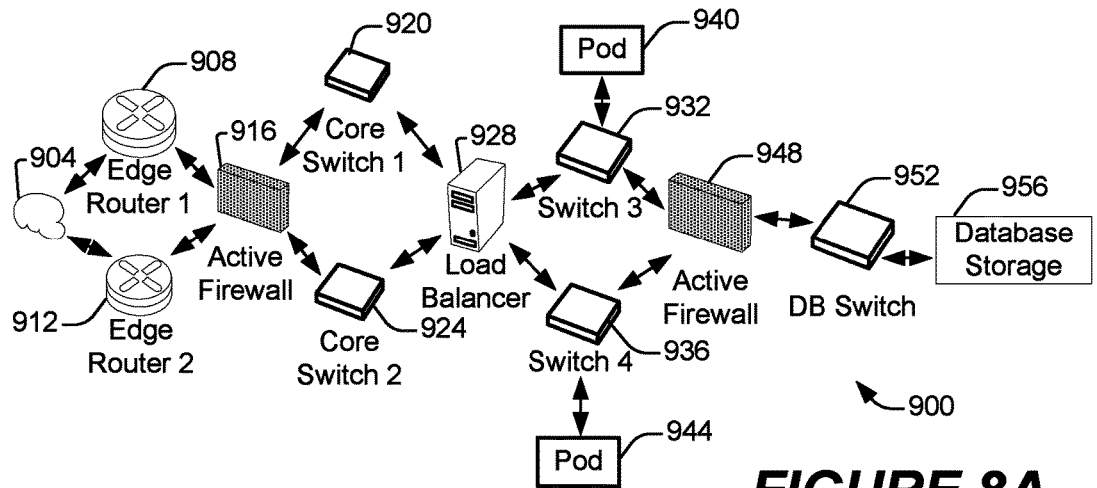
FIG. 8A shows a system diagram of an example of architectural components of an on-demand database service environment 900, in accordance with some implementations.

FIG. 8A shows a system diagram of an example of architectural components of an on-demand database service environment 900, in accordance with some implementations. A client machine located in the cloud 904, generally referring to one or more networks in combination, as described herein, may communicate with the on-demand database service environment via one or more edge routers 908 and 912. A client machine can be any of the examples of user systems 12 described above. The edge routers may communicate with one or more core switches 920 and 924 via firewall 916. The core switches may communicate with a load balancer 928, which may distribute server load over different pods, such as the pods 940 and 944. The pods 940 and 944, which may each include one or more servers and/or other computing resources, may perform data processing and other operations used to provide on-demand services. Communication with the pods may be conducted via pod switches 932 and 936. Components of the on-demand database service environment may communicate with a database storage 956 via a database firewall 948 and a database switch 952.

Figure 8B:
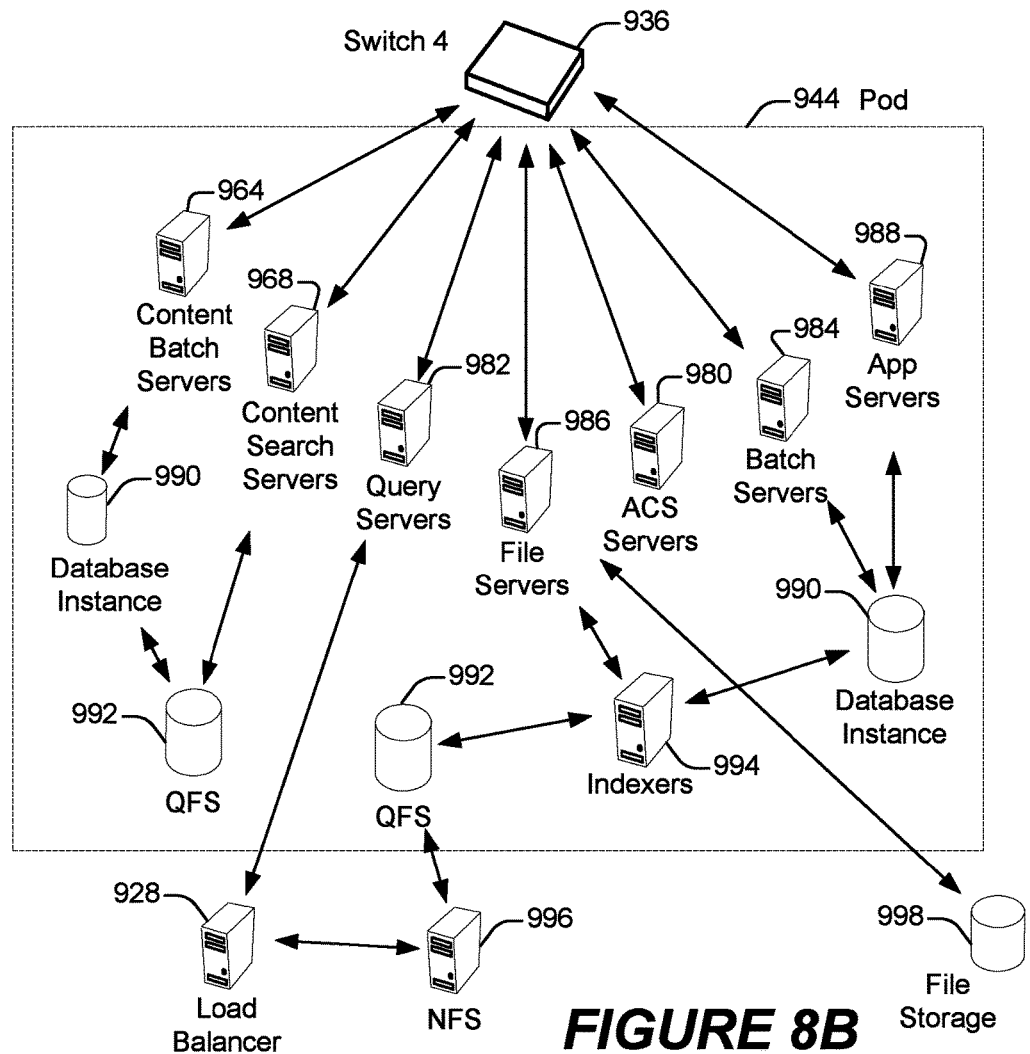
FIG. 8B shows a system diagram further illustrating an example of architectural components of an on-demand database service environment, in accordance with some implementations.

As shown in FIGS. 8A and 8B, accessing an on-demand database service environment may involve communications transmitted among a variety of different hardware and/or software components. Further, the on-demand database service environment 900 is a simplified representation of an actual on-demand database service environment. For example, while only one or two devices of each type are shown in FIGS. 8A and 8B, some implementations of an on-demand database service environment may include anywhere from one to many devices of each type. Also, the on-demand database service environment need not include each device shown in FIGS. 8A and 8B, or may include additional devices not shown in FIGS. 8A and 8B.

Moreover, one or more of the devices in the on-demand database service environment 900 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 904 is intended to refer to a data network or combination of data networks, often including the Internet. Client machines located in the cloud 904 may communicate with the on-demand database service environment to access services provided by the on-demand database service environment. For example, client machines may access the on-demand database service environment to retrieve, store, edit, and/or process information.

In some implementations, the edge routers 908 and 912 route packets between the cloud 904 and other components of the on-demand database service environment 900. The edge routers 908 and 912 may employ the Border Gateway Protocol (BGP). The BGP is the core routing protocol of the Internet. The edge routers 908 and 912 may maintain a table of IP networks or 'prefixes', which designate network reachability among autonomous systems on the Internet.

In one or more implementations, the firewall 916 may protect the inner components of the on-demand database service environment 900 from Internet traffic. The firewall 916 may block, permit, or deny access to the inner components of the on-demand database service environment 900 based upon a set of rules and other criteria. The firewall 916 may act as one or more of a packet filter, an application gateway, a stateful filter, a proxy server, or any other type of firewall.

In some implementations, the core switches 920 and 924 are high-capacity switches that transfer packets within the on-demand database service environment 900. The core switches 920 and 924 may be configured as network bridges that quickly route data between different components within the on-demand database service environment. In some implementations, the use of two or more core switches 920 and 924 may provide redundancy and/or reduced latency.

In some implementations, the pods 940 and 944 may perform the core data processing and service functions provided by the on-demand database service environment. Each pod may include various types of hardware and/or software computing resources. An example of the pod architecture is discussed in greater detail with reference to FIG. 8B.

In some implementations, communication between the pods 940 and 944 may be conducted via the pod switches 932 and 936. The pod switches 932 and 936 may facilitate communication between the pods 940 and 944 and client machines located in the cloud 904, for example via core switches 920 and 924. Also, the pod switches 932 and 936 may facilitate communication between the pods 940 and 944 and the database storage 956.

In some implementations, the load balancer 928 may distribute workload between the pods 940 and 944. Balancing the on-demand service requests between the pods may assist in improving the use of resources, increasing throughput, reducing response times, and/or reducing overhead. The load balancer 928 may include multilayer switches to analyze and forward traffic.

In some implementations, access to the database storage 956 may be guarded by a database firewall 948. The database firewall 948 may act as a computer application firewall operating at the database application layer of a protocol stack. The database firewall 948 may protect the database storage 956 from application attacks such as structure query language (SQL) injection, database rootkits, and unauthorized information disclosure.

In some implementations, the database firewall 948 may include a host using one or more forms of reverse proxy services to proxy traffic before passing it to a gateway router. The database firewall 948 may inspect the contents of database traffic and block certain content or database requests. The database firewall 948 may work on the SQL application level atop the TCP/IP stack, managing applications' connection to the database or SQL management interfaces as well as intercepting and enforcing packets traveling to or from a database network or application interface.

In some implementations, communication with the database storage 956 may be conducted via the database switch 952. The multi-tenant database storage 956 may include more than one hardware and/or software components for handling database queries. Accordingly, the database switch 952 may direct database queries transmitted by other components of the on-demand database service environment (e.g., the pods 940 and 944) to the correct components within the database storage 956.

In some implementations, the database storage 956 is an on-demand database system shared by many different organizations. The on-demand database service may employ a multi-tenant approach, a virtualized approach, or any other type of database approach. On-demand database services are discussed in greater detail with reference to FIGS. 8A and 8B.

FIG. 8B shows a system diagram further illustrating an example of architectural components of an on-demand database service environment, in accordance with some implementations. The pod 944 may be used to render services to a user of the on-demand database service environment 900. In some implementations, each pod may include a variety of servers and/or other systems. The pod 944 includes one or more content batch servers 964, content search servers 968, query servers 982, file servers 986, access control system (ACS) servers 980, batch servers 984, and app servers 988. Also, the pod 944 includes database instances 990, quick file systems (QFS) 992, and indexers 994. In one or more implementations, some or all communication between the servers in the pod 944 may be transmitted via the switch 936.

The content batch servers 964 may handle requests internal to the pod. These requests may be long-running and/or not tied to a particular customer. For example, the content batch servers 964 may handle requests related to log mining, cleanup work, and maintenance tasks.

The content search servers 968 may provide query and indexer functions. For example, the functions provided by the content search servers 968 may allow users to search through content stored in the on-demand database service environment.

The file servers 986 may manage requests for information stored in the file storage 998. The file storage 998 may store information such as documents, images, and basic large objects (BLOBs). By managing requests for information using the file servers 986, the image footprint on the database may be reduced.

The query servers 982 may be used to retrieve information from one or more file systems. For example, the query system 982 may receive requests for information from the app servers 988 and then transmit information queries to the NFS 996 located outside the pod.

The pod 944 may share a database instance 990 configured as a multi-tenant environment in which different organizations share access to the same database. Additionally, services rendered by the pod 944 may call upon various hardware and/or software resources. In some implementations, the ACS servers 980 may control access to data, hardware resources, or software resources.

In some implementations, the batch servers 984 may process batch jobs, which are used to run tasks at specified times. Thus, the batch servers 984 may transmit instructions to other servers, such as the app servers 988, to trigger the batch jobs.

In some implementations, the QFS 992 may be an open source file system available from Sun Microsystems® of Santa Clara, Calif. The QFS may serve as a rapid-access file system for storing and accessing information available within the pod 944. The QFS 992 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 968 and/or indexers 994 to identify, retrieve, move, and/or update data stored in the network file systems 996 and/or other storage systems.

In some implementations, one or more query servers 982 may communicate with the NFS 996 to retrieve and/or update information stored outside of the pod 944. The NFS 996 may allow servers located in the pod 944 to access information to access files over a network in a manner similar to how local storage is accessed.

In some implementations, queries from the query servers 922 may be transmitted to the NFS 996 via the load balancer 928, which may distribute resource requests over various resources available in the on-demand database service environment. The NFS 996 may also communicate with the QFS 992 to update the information stored on the NFS 996 and/or to provide information to the QFS 992 for use by servers located within the pod 944.

In some implementations, the pod may include one or more database instances 990. The database instance 990 may transmit information to the QFS 992. When information is transmitted to the QFS, it may be available for use by servers within the pod 944 without using an additional database call.

In some implementations, database information may be transmitted to the indexer 994. Indexer 994 may provide an index of information available in the database 990 and/or QFS 992. The index information may be provided to file servers 986 and/or the QFS 992.

In some implementations, one or more application servers or other servers described above with reference to FIGS. 7A and 7B include a hardware and/or software framework configurable to execute procedures using programs, routines, scripts, etc. Thus, in some implementations, one or more of application servers $50_1$-$50_N$ of FIG. 7B can be configured to initiate performance of one or more of the operations described above with reference to FIGS. 1-6 by instructing another computing device to perform an operation. In some implementations, one or more application servers $50_1$-$50_N$ carry out, either partially or entirely, one or more of the disclosed operations described with reference to FIGS. 1-6. In some implementations, app servers 988 of FIG. 8B support the construction of applications provided by the on-demand database service environment 900 via the pod 944. Thus, an app server 988 may include a hardware and/or software framework configurable to execute procedures to partially or entirely carry out or instruct another computing device to carry out one or more operations disclosed herein, including operations described above with reference to FIGS. 1-6. In alternative implementations, two or more app servers 988 may cooperate to perform or cause performance of such operations. Any of the databases and other storage facilities described above with reference to FIGS. 7A, 7B, 8A and 8B can be configured to store lists, articles, documents, records, files, and other objects for implementing the operations described above with reference to FIGS. 1-6. For instance, lists of available communication channels associated with share actions for sharing a type of data item can be maintained in tenant data storage 22 and/or system data storage 24 of FIGS. 7A and 7B. By the same token, lists of default or designated channels for particular share actions can be maintained in storage 22 and/or storage 24. In some other implementations, rather than storing one or more lists, articles, documents, records, and/or files, the databases and other storage facilities described above can store pointers to the lists, articles, documents, records, and/or files, which may instead be stored in other repositories external to the systems and environments described above with reference to FIGS. 7A, 7B, 8A and 8B.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of the implementations claimed.

It should be understood that some of the disclosed implementations can be embodied in the form of control logic using hardware and/or computer software in a modular or integrated manner. Other ways and/or methods are possible using hardware and a combination of hardware and software.

Any of the disclosed implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to: magnetic media such as hard disks, floppy disks, and magnetic tape; optical media such as flash memory, compact disk (CD) or digital versatile disk (DVD); magneto-optical media; and hardware devices specially configured to store program instructions, such as read-only memory (ROM) devices and random access memory (RAM) devices. A computer-readable medium may be any combination of such storage devices.

Any of the operations and techniques described in this application may be implemented as software code to be executed by a processor using any suitable computer language such as, for example, Java, C++ or Perl using, for example, object-oriented techniques. The software code may be stored as a series of instructions or commands on a computer-readable medium. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system or computing device may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A system comprising:
a scheduler implemented using one or more processors of a server system, the scheduler configurable to cause:
identifying a final state of a first job previously scheduled by the scheduler as being a partial success or a partial failure in execution by one or more processors, the first job having been previously defined by the scheduler to process at least one first input log file saved to a database during a first one of a sequence of timeframes of a designated interval;
detecting at least one second input log file saved to the database and associated with the first timeframe;
defining a second job to include the at least one first input log file for processing and omit the at least one second input log file responsive to:
identifying the final state of the first job as being a partial success or a partial failure,
detecting the at least one second input log file, and
determining that a retry limit for processing the at least one first input log file has not been traversed; and
scheduling, in association with a second one of the sequence of timeframes, the second job for execution by one or more processors.

2. The system of claim 1, the scheduler further configurable to cause:
identifying a final state of the second job as being partially successful in execution by one or more processors;
detecting at least one third input log file saved to the database and associated with the first timeframe;
defining, responsive to identifying the final state of the second job as being partially successful and responsive to detecting the at least one third input log file, a third job to process the at least one first input log file and the at least one second input log file, the third job omitting the at least one third input log file; and
scheduling, in association with a third one of the sequence of timeframes, the third job for execution by one or more processors.

3. The system of claim 2, the scheduler further configurable to cause:
determining that a retry limit for processing a further input log file associated with the second job has not been traversed by a number of scheduled jobs.

4. The system of claim 2, the scheduler further configurable to cause:
identifying a final state of the third job as being successful in execution by one or more processors;
detecting at least one fourth input log file saved to the database and associated with the first timeframe;
defining, responsive to identifying the final state of the third job as being successful and responsive to detecting the at least one fourth input log file, a fourth job to process the at least one third input log file and the at least one fourth input log file; and
scheduling, in association with a fourth one of the sequence of timeframes, the fourth job for execution by one or more processors.

5. The system of claim 4, the scheduler further configurable to cause:
identifying an output log file resulting from the successful execution of the third job;
treating, responsive to identifying the output log file, the output log file as an immutable job object immediately accessible by computing devices of one or more designated tenants of a multi-tenant database system.

6. The system of claim 1, the scheduler further configurable to cause:
storing metadata in association with the second job, the metadata representing a plurality of parameters of the second job, at least one of the parameters indicating that the second job is a re-run of the first job.

7. The system of claim 1, wherein the scheduler is configurable to run at the designated interval plus an offset.

8. The system of claim 7, wherein the designated interval is one or more hours.

9. A computer program product comprising computer-readable program code capable of being executed by one or more processors when retrieved from a non-transitory computer-readable medium, the program code comprising instructions configurable to cause:
identifying a final state of a first job previously scheduled by a scheduler as being a partial success or a partial failure in execution by one or more processors, the first job having been previously defined by the scheduler to process at least one first input log file saved to a database during a first one of a sequence of timeframes of a designated interval;
detecting at least one second input log file saved to the database and associated with the first timeframe;
defining a second job to include the at least one first input log file for processing and omit the at least one second input log file responsive to:
identifyinq the final state of the first job as being a partial success or a partial failure,
detecting the at least one second input log file, and
determining that a retry limit for processing the at least one first input log file has not been traversed; and
scheduling, in association with a second one of the sequence of timeframes, the second job for execution by one or more processors.

10. The computer program product of claim 9, the instructions further configurable to cause:
identifying a final state of the second job as being partially successful in execution by one or more processors;
detecting at least one third input log file saved to the database and associated with the first timeframe;
defining, responsive to identifying the final state of the second job as being partially successful and responsive to detecting the at least one third input log file, a third job to process the at least one first input log file and the at least one second input log file, the third job omitting the at least one third input log file; and
scheduling, in association with a third one of the sequence of timeframes, the third job for execution by one or more processors.

11. The computer program product of claim 10, the instructions further configurable to cause:
determining that a retry limit for processing a further input log file associated with the second job has not been traversed by a number of scheduled jobs.

12. The computer program product of claim 10, the instructions further configurable to cause:
identifying a final state of the third job as being successful in execution by one or more processors;
detecting at least one fourth input log file saved to the database and associated with the first timeframe;
defining, responsive to identifying the final state of the third job as being successful and responsive to detecting the at least one fourth input log file, a fourth job to process the at least one third input log file and the at least one fourth input log file; and scheduling, in association with a fourth one of the sequence of timeframes, the fourth job for execution by one or more processors.

13. The computer program product of claim 12, the instructions further configurable to cause:
identifying an output log file resulting from the successful execution of the third job;
treating, responsive to identifying the output log file, the output log file as an immutable job object immediately accessible by computing devices of one or more designated tenants of a multi-tenant database system.

14. The computer program product of claim 9, the instructions further configurable to cause:
storing metadata in association with the second job, the metadata representing a plurality of parameters of the second job, at least one of the parameters indicating that the second job is a re-run of the first job.

15. A method comprising:
identifying a final state of a first job previously scheduled by a scheduler as being a partial success or a partial failure in execution by one or more processors, the first job having been previously defined by the scheduler to process at least one first input log file saved to a database during a first one of a sequence of timeframes of a designated interval;
detecting at least one second input log file saved to the database and associated with the first timeframe;
defining a second job to include the at least one first input log file for processing and omit the at least one second input log file responsive to:
identifying the final state of the first job as being a partial success or a partial failure,
detecting the at least one second input log file, and
determining that a retry limit for processing the at least one first input log file has not been traversed; and
scheduling, in association with a second one of the sequence of timeframes, the second job for execution by one or more processors.

16. The method of claim 15, further comprising:
identifying a final state of the second job as being partially successful in execution by one or more processors;
detecting at least one third input log file saved to the database and associated with the first timeframe;
defining, responsive to identifying the final state of the second job as being partially successful and responsive to detecting the at least one third input log file, a third job to process the at least one first input log file and the at least one second input log file, the third job omitting the at least one third input log file; and
scheduling, in association with a third one of the sequence of timeframes, the third job for execution by one or more processors.

17. The method of claim 16, further comprising:
determining that a retry limit for processing a further input log file associated with the second job has not been traversed by a number of scheduled jobs.

18. The method of claim 16, further comprising:
identifying a final state of the third job as being successful in execution by one or more processors;
detecting at least one fourth input log file saved to the database and associated with the first timeframe;
defining, responsive to identifying the final state of the third job as being successful and responsive to detecting the at least one fourth input log file, a fourth job to process the at least one third input log file and the at least one fourth input log file; and scheduling, in association with a fourth one of the sequence of timeframes, the fourth job for execution by one or more processors.

19. The method of claim 18, further comprising:

identifying an output log file resulting from the successful execution of the third job;

treating, responsive to identifying the output log file, the output log file as an immutable job object immediately accessible by computing devices of one or more designated tenants of a multi-tenant database system.

20. The method of claim 15, further comprising:

storing metadata in association with the second job, the metadata representing a plurality of parameters of the second job, at least one of the parameters indicating that the second job is a re-run of the first job.

* * * * *